(12) United States Patent
Hazlewood

(10) Patent No.: US 8,167,372 B2
(45) Date of Patent: May 1, 2012

(54) SEAT ASSEMBLY HAVING DUAL ACTUATED LOCKING MECHANISM

(75) Inventor: Robert Joseph Hazlewood, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 257 days.

(21) Appl. No.: 12/628,489

(22) Filed: Dec. 1, 2009

(65) Prior Publication Data

US 2011/0127818 A1 Jun. 2, 2011

(51) Int. Cl.
*B60N 2/02* (2006.01)
*F16M 13/00* (2006.01)

(52) U.S. Cl. ............. 297/341; 297/378.14; 248/429

(58) Field of Classification Search ............ 297/340, 297/341, 378.14; 248/429
See application file for complete search history.

(56) References Cited

U.S. PATENT DOCUMENTS

| 4,423,904 | A | 1/1984 | Crawford | |
|---|---|---|---|---|
| 5,695,247 | A | 12/1997 | Premji | |
| 6,341,819 | B1 * | 1/2002 | Kojima et al. | 297/341 |
| 6,641,218 | B2 * | 11/2003 | Ito et al. | 297/378.12 |
| 7,017,993 | B2 | 3/2006 | Niimi et al. | |
| 7,059,679 | B2 * | 6/2006 | Yamada | 297/341 |
| 7,434,884 | B2 * | 10/2008 | Becker et al. | 297/341 |
| 7,780,138 | B1 * | 8/2010 | Lee et al. | 248/429 |

* cited by examiner

*Primary Examiner* — Sarah B McPartlin
(74) *Attorney, Agent, or Firm* — Gifford, Krass, Sprinkle, Anderson & Citkowski, P.C.

(57) ABSTRACT

A seat assembly for supporting an occupant above a floor of a passenger compartment of an automotive vehicle is provided. The seat assembly includes a dual actuated lever mechanism operable by movement of a seat back from a seated position to a stowed position or the actuation of a handle. The lever mechanism engages with a locking mechanism such that when the lever mechanism is in a first position a first lock locks the upper rails to the lower rails when the seat assembly is in the seated position. When the lever mechanism is in a second position a second lock locks the upper rails to the lower rails when the seat assembly is in the cargo position.

15 Claims, 10 Drawing Sheets

SEAT ASSEMBLY HAVING DUAL ACTUATED LOCKING MECHANISM

FIELD OF THE INVENTION

The invention relates to a seat assembly for use in automotive vehicles. More particularly, the invention relates to a seat assembly having a locking mechanism operable by a lever mechanism which is configured to be actuated by either the movement of the seat back or operation of a handle.

BACKGROUND OF THE INVENTION

As seating capacity is a concern for consumers, many automotive vehicles come equipped with a third row of passenger seating. However, in order to access the third row seating an occupant needs to first move the second row seating to create an ingress or egress path. Consequently, most modern automotive vehicle utilize a recliner or release mechanism for moving the seat back between a seated position and a stowed position to allow greater access to the third row seating. Further, it is also known to provide seat assemblies which are slidably engaged with the floor of the passenger compartment to lock the seat assembly in a seated position and slide the entire seat assembly towards a cargo position. The sliding mechanism, in conjunction with the pivotal seat back, provides an occupant with easy access to the third row seating.

As there are several handles or levers which operate the various operational components associated with the release mechanism and the sliding mechanism, most modern seat assemblies have become complex. In order to position the seat assembly to allow access to the third row seating, an occupant is required to actuate a number of different handles to operate a number of independent mechanisms. Further, the costs associated with modern seat assemblies have increased due to the increase in the number of parts, and the increase in the labor and manufacturing time required to produce and install the seat assemblies.

Thus, there exists a need for a seat assembly having a horizontally slidable seat assembly and a pivotal seat back which reduces the steps required to position the seat assembly for ingress or egress, and which reduces the overall complexity of the mechanism involved.

SUMMARY OF THE INVENTION

The invention provides a horizontally slidable seat assembly having a pivotal seat back which overcomes the above-mentioned disadvantages.

In brief, a seat assembly for supporting an occupant above a floor of a passenger compartment of an automotive vehicle is provided. The seat assembly includes a seat frame having a pair of upper seat rails engaged with a pair of lower floor rails embedded in the floor to horizontally slide a seat assembly between a seated position and a cargo position. A seat back is pivotally mounted to the seat frame for movement between a seated position and a stowed position. A locking mechanism has a first lock and a second lock. The first lock is operable to lock and release the seat rails to the floor rails when the seat assembly is in the seated position. The second is operable to lock and release the upper rails to the lower rails when the seat assembly is in the cargo position A lever mechanism having a handle pivotally mounted to the seat frame operates the locking mechanism. The lever mechanism is moveable between a first position and a second position. When the lever mechanism is in the first position the lever mechanism engages with the first lock to lock the upper rails to the lower rails when the seat assembly is in the seated position. When the lever mechanism is in the second position the lever mechanism engages with the second lock to lock the upper rails to the lower rails when the seat assembly is in the cargo position.

The seat assembly also includes a seat back pivotally mounted to the seat frame for movement between a seated position and a stowed position. The seat back is connected to the lever mechanism such that movement of the seat back from the seated position to the stowed position moves the lever mechanism from the first position to the second position and movement of the seat back from the stowed position to the seated position moves the lever mechanism from the second position to the first position.

The lever mechanism is actuated by either operation of the handle, or the movement of the seat back between the seated position and the stowed position. As such, the seat assembly can be unlocked from the seated position by either the movement of the seat back from the seated position to the stowed position, or the operation of the handle. Further, the seat assembly can be unlocked from the cargo position by either operation of the handle, if the seat back is in the seated position, or the movement of the seat back from the stowed position to the seated position.

BRIEF DESCRIPTION OF THE DRAWINGS

Advantages of the present invention will be readily appreciated as the same becomes better understood by reference to the following detailed description when read in conjunction with the accompany drawings, wherein like reference characters refer to like parts throughout the several views and in which.

DETAILED DESCRIPTION OF THE INVENTION

The present invention has utility as a seat assembly for supporting an occupant above a floor of a passenger compartment of an automotive vehicle which overcomes the above-mentioned disadvantages. The inventive seat assembly provides a dual actuated lever mechanism for locking and releasing a seat assembly in a seated position and a walk-in or cargo position. As the dual actuation lever mechanism utilizes one mechanism operable by two different means, rather than two independent mechanisms, the complexity of the seat assembly is reduced. Further, the overall costs, including labor and manufacturing time, is also reduced along with the overall weight of the seat assembly.

Figure 1:
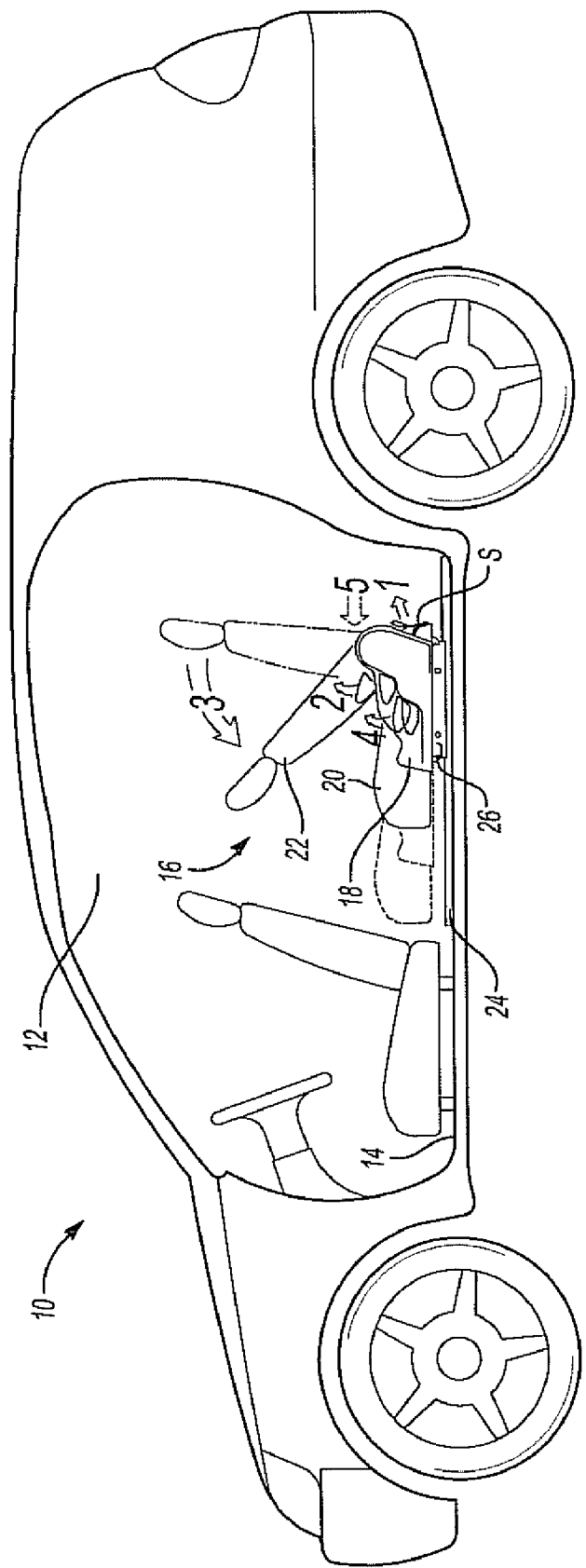
FIG. 1 is a partial side elevational view illustrating an automotive vehicle having the inventive seat assembly.

Referring to FIG. 1, an automotive vehicle is generally indicated at 10. The automotive vehicle includes a passenger compartment 12 having a floor 14. A front row seating, including the driver's seat; a second row seating; and optionally a third row seating (not shown) or additional cargo space is provided in the passenger compartment 12. A seat assembly 16, located in the second row seating, includes a seat frame 18, a seat cushion 20, and a seat back 22. The seat back 22 is pivotally mounted to the seat frame 18 for movement between a seated position, seen in ghost in FIG. 1, and a stowed position.

The passenger compartment 12 includes a pair of lower rails 24 attached to the floor 14. The seat frame 18 includes a pair of upper rails 26 in sliding engagement with the pair of lower rails 24 for horizontal movement of the seat assembly 16 between a seated position and a cargo position, seen in ghost in FIG. 1. The seat frame 18 is optionally releasably mounted to the upper rails 26 so that the entire seat assembly 16 may be removed from the passenger compartment 12 of the automotive vehicle 10.

By positioning the seat back 22 in the stowed position and the seat assembly 16 in the cargo position an occupant is afforded greater access to a third row seating or additional cargo area, or in the case of a two door automotive vehicle the second row seating. As will be described in greater detail below, the seat assembly 16 is locked in the seated position so as to safely support an occupant during travel. In addition, the seat assembly 16 is also lockable in the cargo position to provide additional cargo space without the seat assembly moving during travel.

Figure 2:
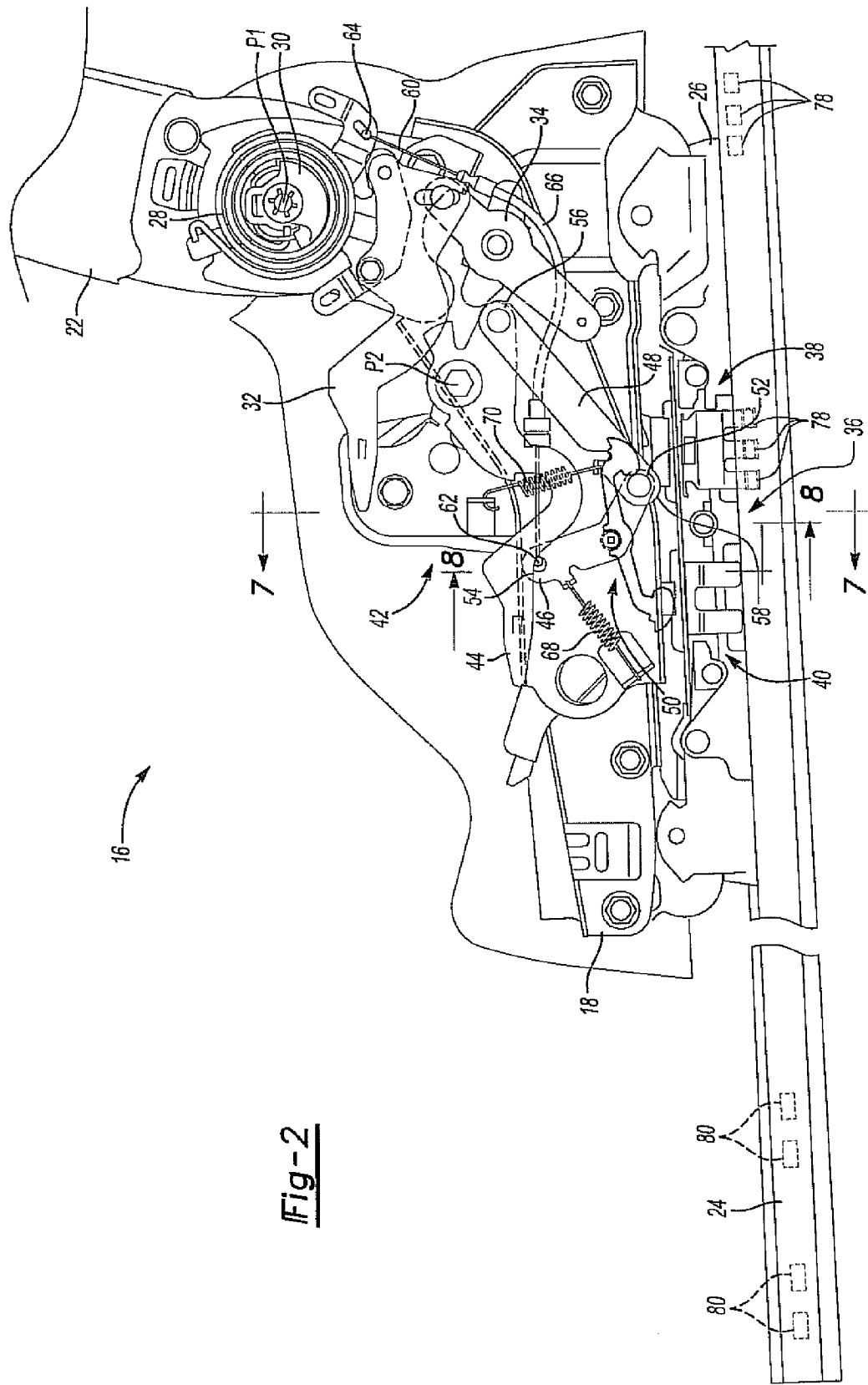
FIG. 2 is a partial side elevational view of the seat assembly illustrating the seat assembly locked in the seated position with the lever mechanism in the first position and the seat back in the seated position.

Referring to FIG. 2, the seat back 22 is pivotally coupled to the seat frame 18 at pivot axis P1 for selective movement between a seated position and a stowed position. The seat back 22 includes a seat back biasing member 28, such as a clock spring, which continuously biases the seat back 22 towards the stowed position. A recliner mechanism 30 actuated by a recliner handle 32 releasably locks the seat back 22 in the seated position. In addition, the recliner mechanism 30 allows an occupant seated in the seat assembly 16 to adjust the position of the seat back 22 to a plurality of reclined positions tilted rearwardly from the seated position.

The occupant actuates the recliner handle 32 and overcomes the force of the seat back biasing member 28 to position their seat back 22 in the desired reclined position. The occupant then returns the recliner handle 32 to its initial position to lock the seat back 22 in the desired reclined position. If an occupant is not seated in the seat assembly 16 when the recliner handle 32 is actuated or an occupant seated behind the seat assembly 16 operates a rear actuated egress mechanism 34, the recliner mechanism 30 releases the seat back 22 from the seated position or reclined position and the seat back biasing member 28 will bias the seat back 22 towards the stowed position.

The egress mechanism 34 indirectly operates the recliner mechanism 30 as it is operatively connected to the recliner handle 32 at one end. A strap S, seen in FIG. 1, is attached to the opposite end of the egress mechanism 34. An occupant pulls on the strap S in the direction of arrow 1, and the egress mechanism 34 actuates the recliner handle 32 in the direction of arrow 2 which operates the recliner mechanism 30 to pivot the seat back 22 from the seated position to the stowed position in the direction of arrow 3.

It is appreciated, of course, that the above described recliner mechanism 30 and egress mechanism 32 are for illustrative purposes only. The seat assembly 16 is operable with any other recliner mechanism or egress mechanisms known to those of ordinary skill in the art to move a seat back 22 from a seated position to a stowed position by an occupant either in front or behind the seat assembly 16.

The seat assembly 16 includes a locking mechanism 36 attached to the upper rail 26. The locking mechanism 36 includes a main lock 38 and a cargo lock 40. The main lock 38 is operable to lock the upper rails 26 to the lower rails 24 when the seat assembly 16 is in the seated position. The cargo lock 40 is operable to lock the upper rail 26 to the pair of lower rails 24 when the seat assembly 16 is in the cargo position. It is appreciated, of course, that the locking mechanism 36 is disposed on each one of the pair of upper rails 26, although operation of only one side will be described as each is a mirror image of the other.

A dual actuated lever mechanism 42 is provided so as actuate the locking mechanism 36. The lever mechanism 42 includes a slide handle 44, a bracket 46, a link member 48, and an actuation mechanism 50 to engage with the locking mechanism 36. The slide handle 44 is attached to the seat frame 18 to pivot about pivot axis P2, and is operable by an occupant. The bracket 46 is attached to the actuation mechanism 50 such that rotation of the bracket 46 rotates the actuation mechanism 50 in a corresponding direction. The bracket 46 has a generally V shape having a first end 52 and a second end 54. The bracket 46 is attached to the actuation mechanism 50 at a center portion between the first end 52 and the second end 54. A link member 48, having a distal end 56 and a proximate end 58, connects the bracket 46 and the slide handle 44 such that operation of the slide handle 44 rotates the bracket 46 and, consequently, the actuation mechanism 50. The distal end 56 of the link member 48 is pivotally attached to the slide handle 44 and the proximate end 58 pivotally attached to a first end 52 of the rotating bracket 44.

The second end 54 of the bracket 46 is connected to the seat back by a cable 60, such as a Bowden cable, having a bracket end 62 attached to the bracket 46 and a seat back end 64 attached to the seat back 22. The cable 60 includes a housing 66 having two opposite ends which are attached to the seat frame 18.

A bracket biasing member 68 has one end attached to the seat frame 18 and the other end attached to the bracket 46 adjacent the second end 54. A link biasing member 70 has one end attached to the seat frame 18 and an opposite end attached to the link member 48 adjacent the proximate end 58. The bracket biasing member 68 and the link biasing member 70 bias the lever mechanism 42 towards a first position, as seen in FIG. 2.

Figure 7:
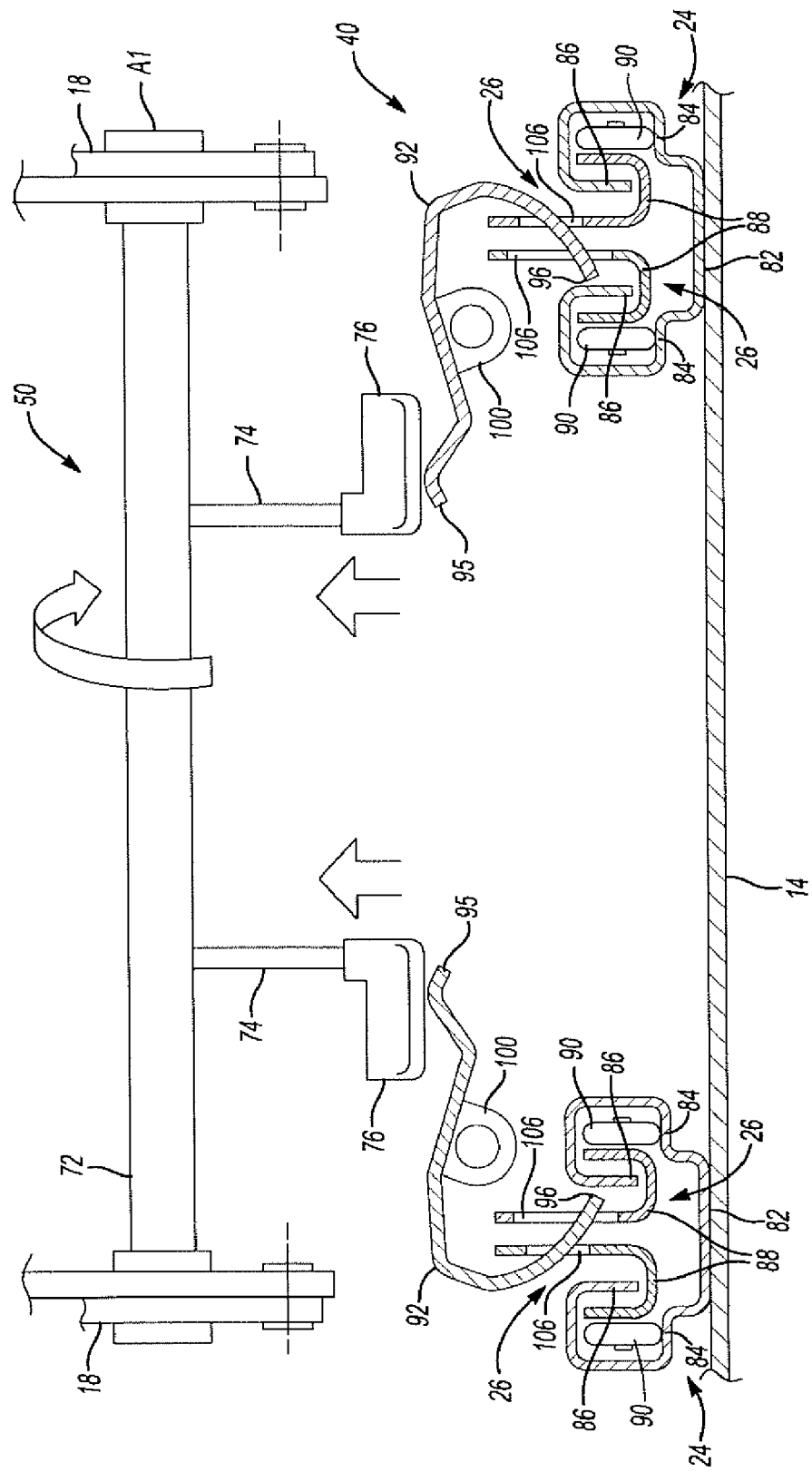
FIG. 7 is a partial cross-sectional view taken along the line 7-7 of FIG. 2, illustrating the cargo lock in the unlocked position.
Figure 8:
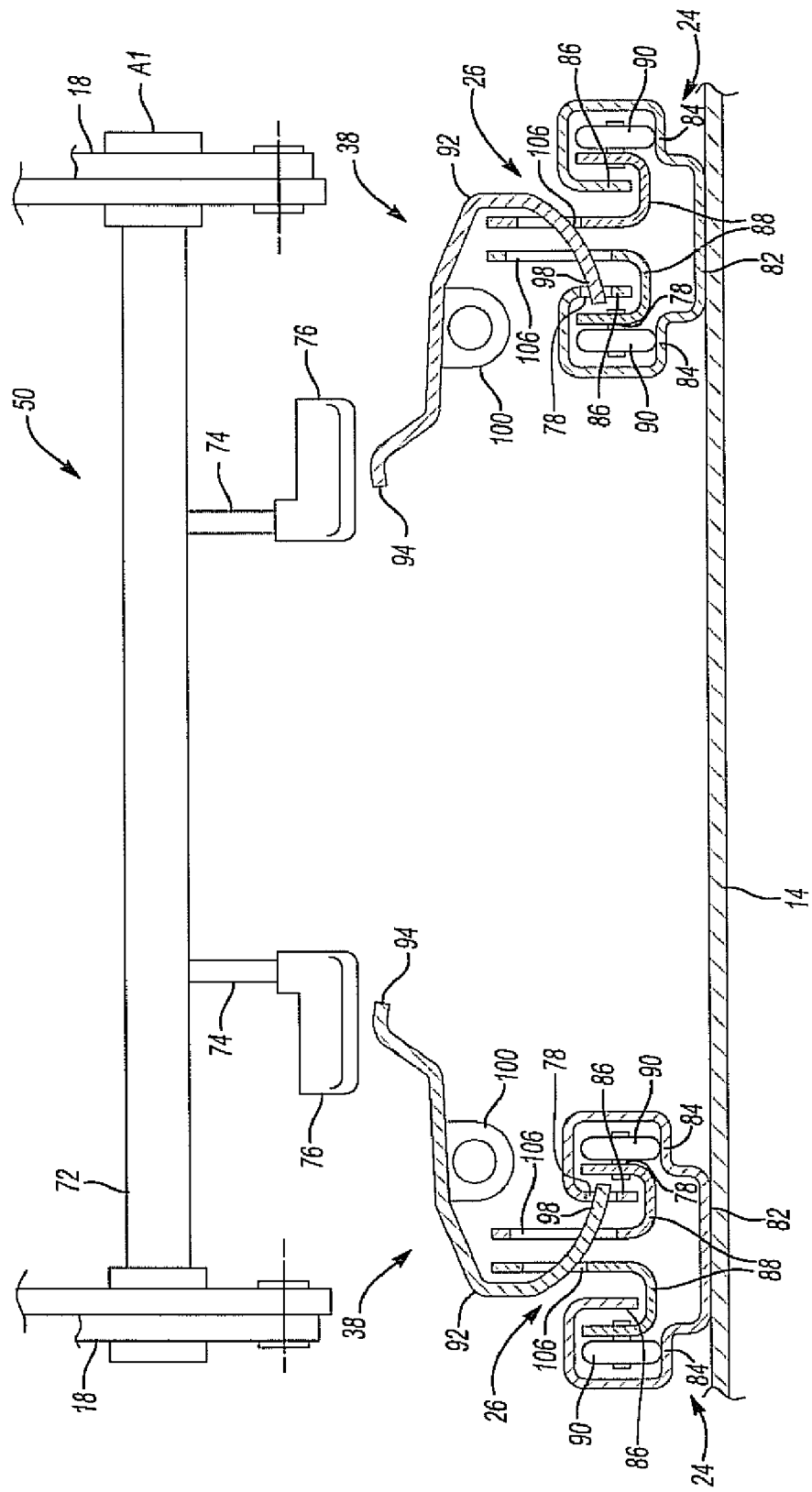
FIG. 8 is a partial cross-sectional view taken along the line 8-8 of FIG. 2 illustrating the main lock in the locked position.

As seen in FIGS. 7 and 8, the actuation mechanism 50 includes an elongated rod 72 rotatably attached to the seat frame 18 for rotation about axis A1. The elongated rod 72 is fixedly attached to the center portion of the bracket 46 such that rotation of the bracket 46 rotates the elongated rod 72. The actuation mechanism 50 further includes a pair of paddle members 74 which extend generally normal from the elongated rod 72. The paddle members 74 are positioned on the elongated rod 72 so that one of the paddle members 74 engages with the locking mechanism 36 disposed on each one of the upper rails 26. A shoe 76 is disposed on the ends of each of the paddle members 74. The shoes 76 are formed of a plastic or rubber material, to provide frictional contact with the locking mechanism 36.

Figure 4:
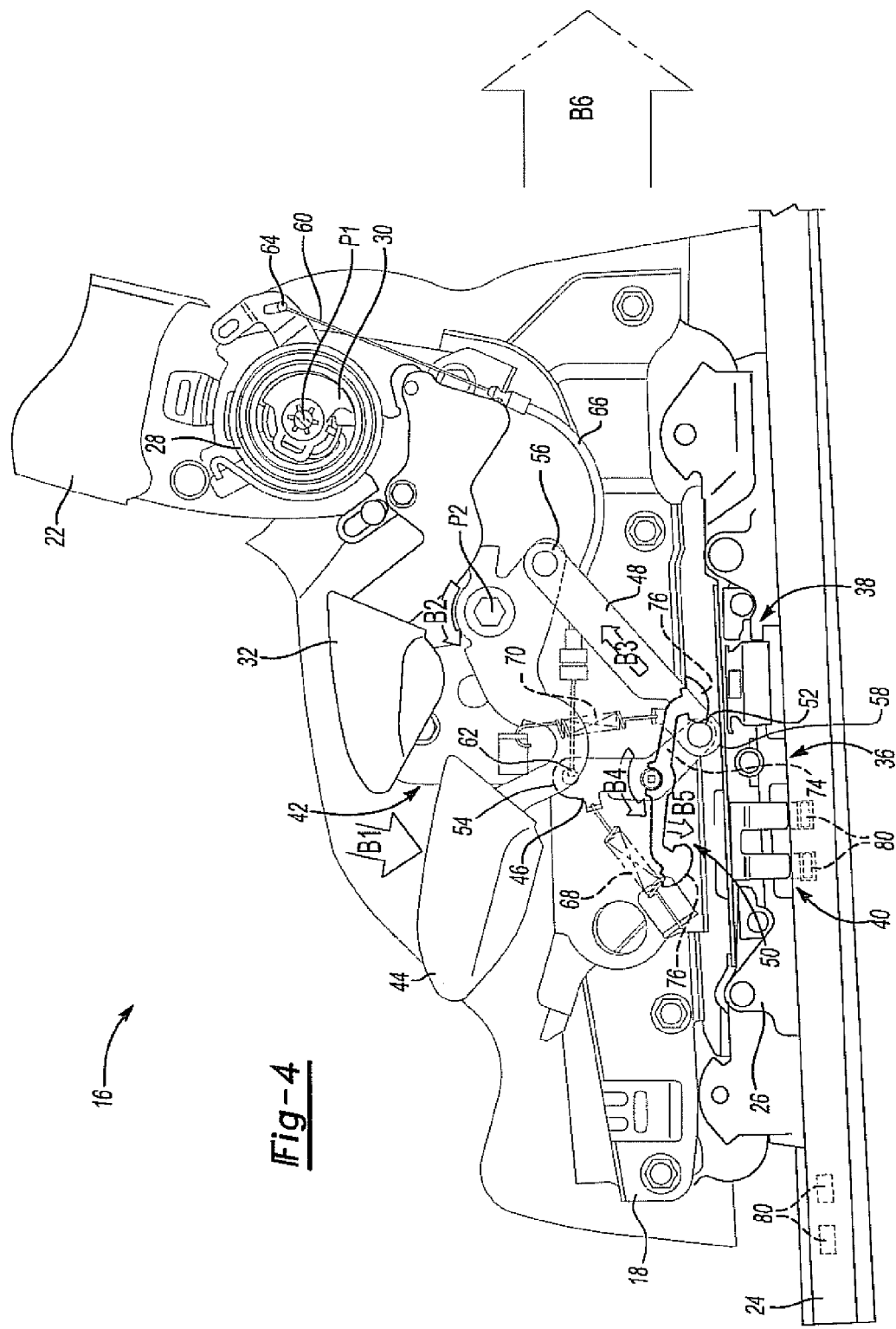
FIG. 4 is a partial side elevational view of the seat assembly illustrating the seat assembly locked in the cargo position and the lever mechanism in the second position.

As seen in FIG. 2, the seated position of the seat assembly 16 corresponds to a plurality of teeth windows 78 which engage with the main lock 38 to lock the seat assembly 16 in the seated position, and the cargo position corresponds to a plurality of window tabs 80 which engage with the cargo lock 40 to lock the seat assembly 16 in the cargo position, as seen in FIG. 4. The window teeth 78 and the window tabs 80 have varying positions, numbers, and sizes, allowing for the main lock 38 to only be engaged with the window teeth 78 while the cargo lock 40 is capable of only engaging with the window tabs 80. As illustrated, the lower rails 24 optionally include a plurality of both seated positions and cargo positions selectable by an occupant.

Referring now to FIGS. 7 and 8, the interaction of the locking mechanism 36 with the pair of upper rails 26 and the pair of lower rails 24 will now be explained. The pair of lower rails 24 are attached to the floor 14 of the passenger compartment 12; or, in the alternative, the pair of lower rails 24 are embedded within the floor 14. The pair of lower rails 24 have a generally U shaped cross section with a bottom section 82 having a rail 84 with an overhanging flange 86 disposed at either end of the bottom section 82. The pair of upper rails 26 each have a pair of J-shaped arms 88 having a roller 90 contacting the rail 84 on either side of the bottom section 82. The rollers 90 allow the pair of upper rails 26 of the seat assembly 16 to slide with respect to the pair of lower rails 24.

In order for the locking mechanism 36 to lock the pair of upper rails 26 to the pair of lower rails 24, the window teeth 78 and the window tabs 80 are disposed on the flange 86 on the interior side of the lower rails 24. The window teeth 78 and the window tabs 80 engage with the main lock 38 and the cargo lock 40, respectively, to lock the seat assembly 16 in the seated position or the cargo position.

As seen in FIG. 7, the seat assembly 16 is locked in the seated position with the cargo lock 40 in the unlocked position. The cargo lock 40 has a hook 92 having a generally C cross-sectional shape with an extension 95 at one end and tabs 96 at an opposite end. The tabs 96 correspond to window tabs 80 formed in the flange 86 to lock the seat assembly 16 in the cargo position. The tabs 96 correspond in position and size to the window tabs 80 formed on the flange 86. As the seat assembly 16 is in the seated position, there are no window tabs 80 corresponding to the position of the cargo lock 40.

As seen in FIG. 8, the main lock 38 is identical to cargo lock 40 having a hook 92 with a generally C-shaped cross section and an extension 94 at one end. The main lock 38 differs from the cargo lock 40 as the main lock includes teeth 98 located at an opposite end to engage with window teeth 78 formed on the flange 86 of the pair of lower rails 24. The teeth 98 correspond in position and size to the window teeth 78 formed on the flange 86.

Figure 9A:
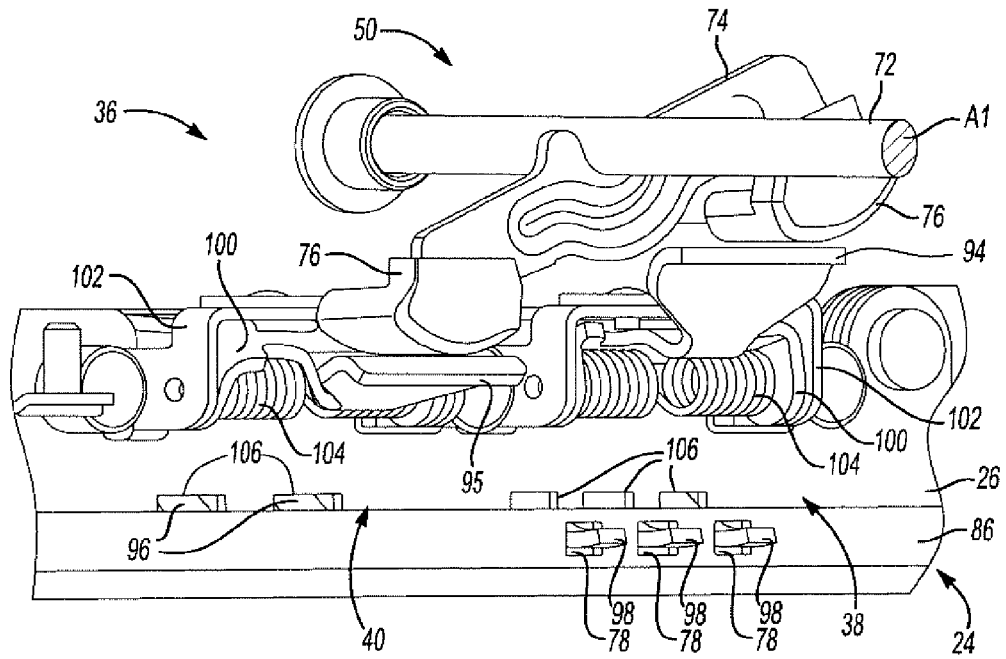
FIG. 9A is a partial perspective view illustrating the seat assembly locked in the seated position.

Referring to FIG. 9A, the main lock 38 and the cargo lock 40 include arms 100 extending from the hooks 92. The arms 100 are pivotally coupled to brackets 102 formed on the pair of upper rails 26 for movement between a locked position, an engaged position, and an unlocked position. Hook biasing members 104 bias the hooks 92 towards the locked position such that the extensions 94, 95 are in a raised or upwardly positions.

Figure 10A:
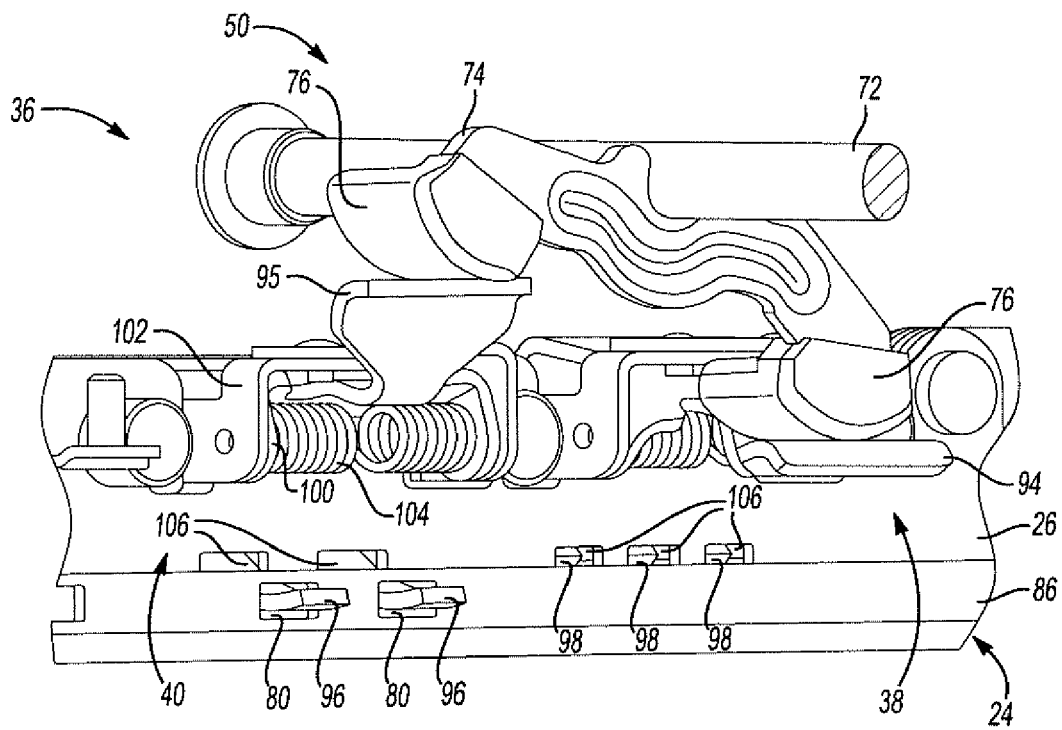
FIG. 10A is a partial perspective view illustrating the seat assembly locked in the cargo position.

In the locked position the hook 92 is biased by the hook biasing member 104 such that, in the case of the main lock 38, the teeth 98 extend through apertures 106 formed on the pair of upper rails 26 and engage with the window teeth 78 formed on the flange 86 of the pair of lower rails 24 when the seat assembly 16 is in the seated position, as seen in FIG. 9A, and in the case of the cargo lock 40, the hook biasing member 104 biases the hook 92 such that the tabs 96 extend through apertures 106 formed on the pair of upper rails 26 and engage with the window tabs 80 formed in the flange 86 of the pair of lower rails 24 when the seat assembly 16 is in the cargo position, as seen in FIG. 10A.

In order to move the main lock 38 and the cargo lock 40 between the locked/engaged position and the unlocked position, the actuation mechanism 50 is rotated such that the shoe 76 on one end of the paddle member 74 contacts one of the main lock 38 or the cargo lock 40 to depress the extensions 94, 95 downwardly to an unlocked position, and raise the shoe 76 on the other end of the paddle member 74 off the extension 94, 95 of the other of the main lock 38 or the cargo lock 40 to either the engaged position or the locked position.

Figure 9B:
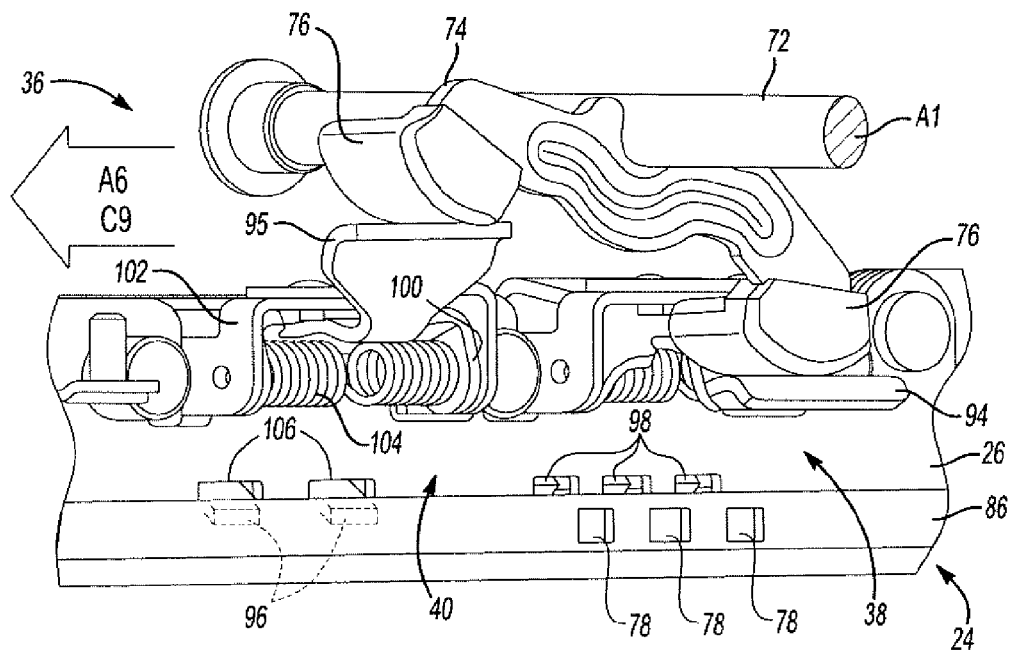
FIG. 9B is a partial perspective view illustrating the seat assembly moving from the seated position to cargo position with the main lock in the unlocked position and the cargo lock in the engaged position.
Figure 10B:
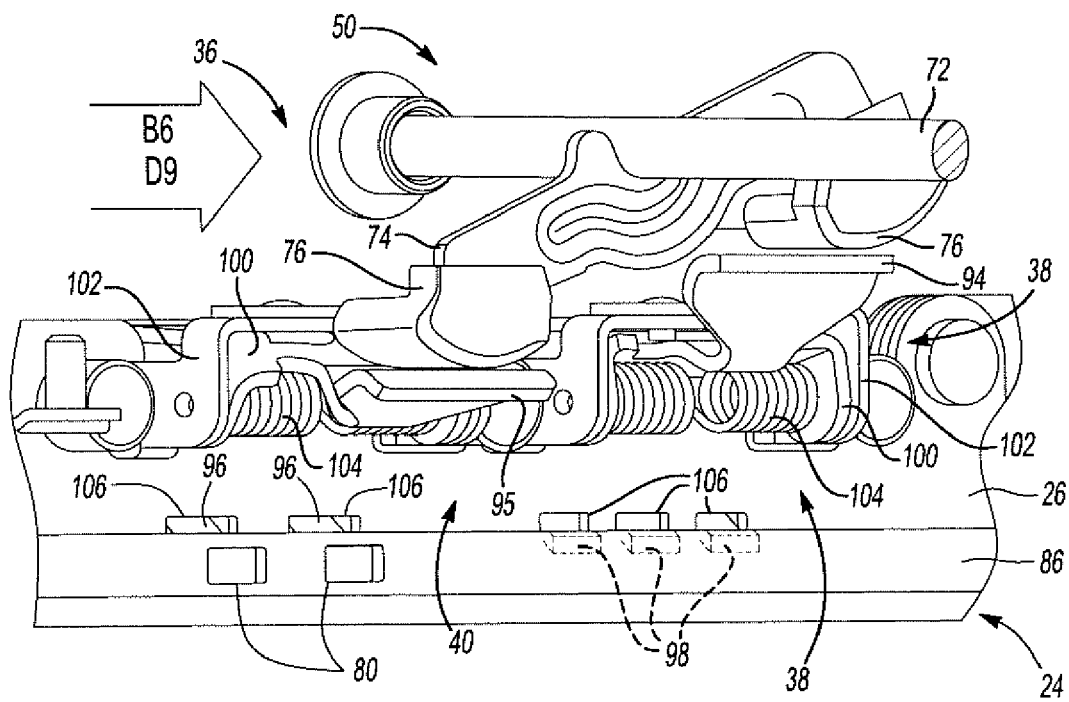
FIG. 10B is a partial perspective view illustrating the seat assembly moving from the cargo position to the seated position with the cargo lock in the unlocked position and the main lock in the engaged position.

The main lock 38 will be in the locked position when the actuation mechanism 50 is positioned such that the main lock 38 extension 94 is raised and the seat assembly 16 is in the seated position allowing the teeth 98 to engage with the window teeth 78 as seen in FIG. 9A. The main lock 38 will be in the unlocked position when the actuation mechanism 50 is positioned such that the main lock 38 extension 94 is depressed downwardly, as seen in FIGS. 9B and 10A. The main lock 38 will be in the engaged position when the actuation mechanism 50 is positioned such that the main lock 38 extension 94 is raised and the seat assembly 16 is not in the seated position, thereby, causing the teeth 98 to contact and slide along the flange 86 of the lower rails 24, as seen in FIG. 10B. Once the seat assembly 16 is in the seated position the teeth 98 will engage with the window teeth 78 due to the biasing force of the hook biasing members 104 and the main lock 38 will be in the locked position.

The cargo lock 40 will be in the locked position when the actuation mechanism 50 is positioned such that the cargo lock 40 extension 95 is raised and the seat assembly 16 is in the cargo position allowing the tabs 96 to engage with the window tabs 80, as seen in FIG. 10A. The cargo lock 40 will be in the unlocked position when the actuation mechanism 50 is positioned such that the cargo lock 40 extension 95 is depressed downwardly, as seen in FIGS. 9A and 10B. The cargo lock 40 will be in the engaged position when the actuation mechanism 50 is positioned such that the cargo lock 40 extension 95 is raised and the seat assembly 16 is not in the cargo position, thereby, causing the tabs 96 to contact and slide along the flange 86 of the lower rails 24, as seen in FIG. 9B. Once the seat assembly 16 is in the cargo position the tabs 96 will engage with the window tabs 80 due to the biasing force of the hook biasing members 104.

In order to facilitate a better understanding of the principles associated with the inventive seat assembly, the operation of releasing and locking the seat assembly from a seated position to a cargo position and back will now be described. As stated above, the lever mechanism 42 is capable of movement between a first position and a second position by either movement of the seat back 22 or operation of the slide handle 44. As such, the operation by each method will be described separately.

Figure 3:
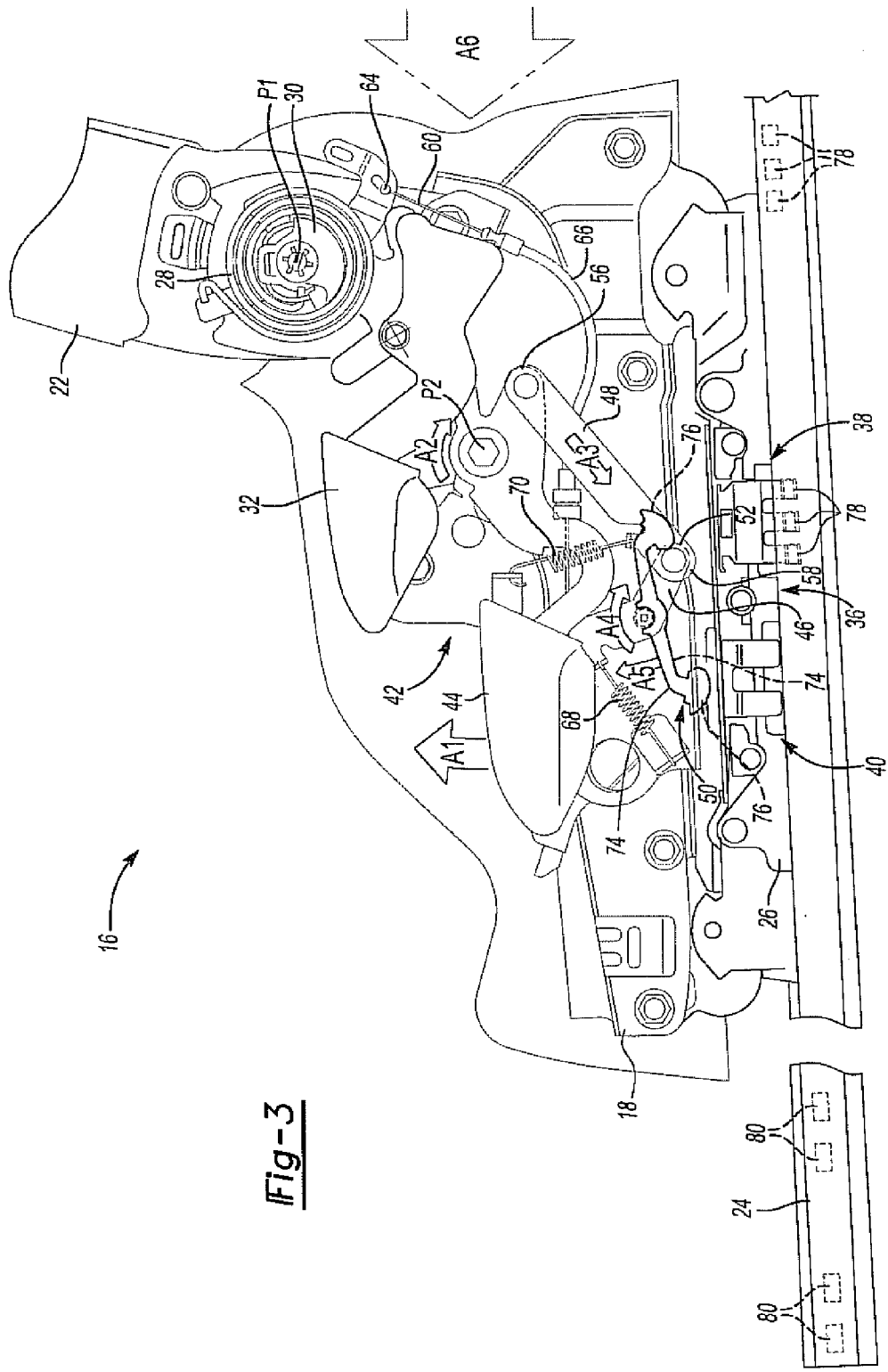
FIG. 3 is a partial side elevational view of the seat assembly illustrating the movement of the lever mechanism from the first position to the second position due to the operation of the handle.

The operation of releasing and locking the seat assembly 16 between the seated position and the cargo position through actuation of the slide handle 44 will now be described. As seen in FIG. 3, the seat assembly 16 is locked in the seated position, with the seat back 22 in the seated position and the lever mechanism 42 in a first position. FIG. 9A depicts the actuation mechanism 50 positioned with one shoe 76 lifted off main lock 38 extension 94 to lock the main lock 38, and the other shoe 76 depressing the cargo lock 40 extension 95 to unlock the cargo lock 40. The teeth 98 are engaging with window teeth 78 formed in the flange 86 of the lower rail 24, thereby, locking the upper rail 26 to the lower rail 24 at the seated position.

Referring back to FIG. 3, upon actuation of the slide handle 44 in the direction of A1, the slide handle 44 pivots about pivot axis P2 in the direction of A2. The pivoting movement of the slide handle 44 pushes the link member 48 in the direction of A3 which rotates bracket 46 in the direction of A4. As the bracket 46 is attached to the actuation mechanism 50, the rotation of the pivoting bracket 46 rotates elongated rod 72 and the paddle member 74 in the direction of A5, thereby, moving the lever mechanism 42 from the first position to the second position.

The rotation of the actuation mechanism 50 in the direction of A5 moves the main lock 38 from the locked position as seen in FIG. 9A to the unlocked position as seen in FIG. 9B. In addition, the rotation of the actuation mechanism 50 in the direction of A5 moves the cargo lock 40 from an unlocked position towards the locked position. As seen in FIG. 9B, the seat assembly 16 is still in the seated position and there are no window tabs 80 for the tabs 96 to engage. The cargo lock 40 is in an engaged position with the tabs 96 abutting the flange 86. The seat assembly 16 is now movable in the direction of arrow A6 towards the cargo position where the tabs 96 will align with and engage the window tabs 80 to lock the upper rail 26 to the lower rail 24 in the cargo position as seen in FIG. 10A.

FIG. 4 illustrates the seat assembly 16 locked in the cargo position, with the seat back 22 in the seated position and the lever mechanism 42 in the second position. FIG. 10A depicts the actuation mechanism 50 positioned with one shoe 76 lifted off the cargo lock 40 extension 95 to lock the cargo lock 40, and the other shoe 76 depressing the main lock 38 extension 94 to unlock the main lock 38. The tabs 96 are engaging with the window tabs 80 formed in the flange 86 of the lower rail 24, thereby locking the upper rail 26 to the lower rail 24 at the cargo position.

In order to unlock the seat assembly 16 from the cargo position, the slide handle 44 is actuated in the direction of arrow B1. The slide handle 44 pivots about axis P2 in the direction of arrow B2 which pulls link member 48 in the direction of arrow B3. The movement of link member 48 will rotate bracket 46 in the direction of arrow B4. As the bracket 46 is attached to the actuation mechanism 50, the rotation of the bracket 46 rotates the elongated rod 72 and the paddle members 74 in the direction of B5, thereby, moving the lever mechanism 42 from the first position to the second position.

The rotation of the actuation mechanism 50 in the direction of arrow B5 moves the cargo lock 40 from the locked position, as seen in FIG. 10A, to the unlocked position as seen in FIG. 10B. In addition, the rotation of the actuation mechanism 50 in the direction of B5 moves the main lock 38 from the unlocked position towards the locked position. As seen in FIG. 10B, the seat assembly is still in the cargo position and there are no window teeth 78 for the teeth 98 to engage. The main lock 38 is in the engaged position with the teeth 98 abutting the flange 86. The seat assembly 16 is now movable in the direction of arrow B6 towards the seated position where the teeth 98 will align with and engage the window teeth 78 to lock the upper rail 26 to the lower rail 24 in the seated position as seen in FIG. 9A.

Figure 5:
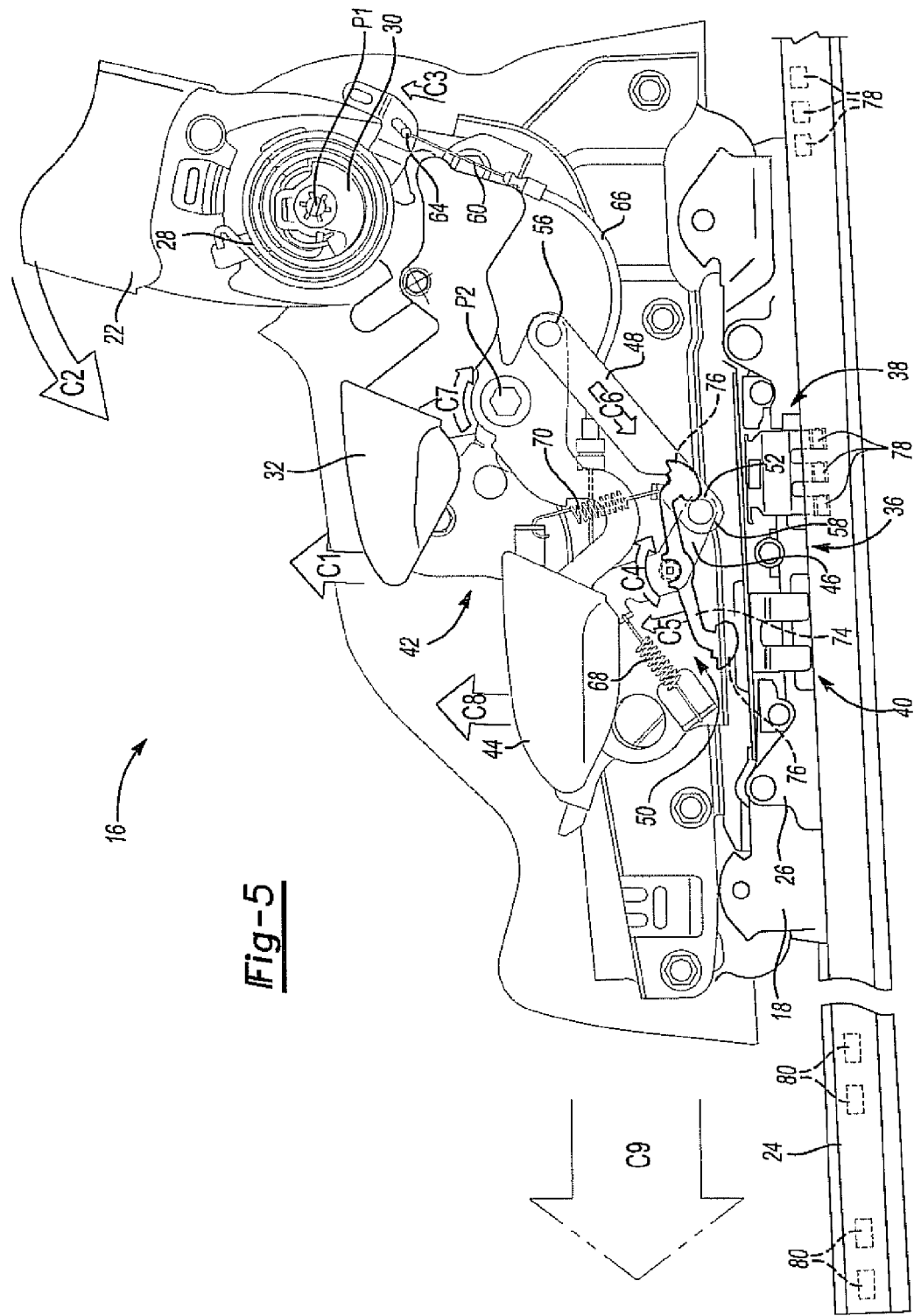
FIG. 5 is a partial side elevational view of the seat assembly illustrating the seat assembly locked in the seated position and the movement of the lever mechanism from the first position to the second position due to the movement of the seat back from the seated position to the stowed position.

The operation of releasing and locking the seat assembly 16 between the seated position and the cargo position using movement of the seat back 22 will now be discussed. Referring to FIG. 5, the seat assembly 16 is locked in the seated position, with the seat back 22 in the seated position and the lever mechanism 42 in the first position. FIG. 9A depicts the actuation mechanism 50 positioned with one shoe 76 lifted off main lock 38 extension 94 to lock the main lock 38, and the other shoe 76 depressing the cargo lock 40 extension 95 to unlock the cargo lock 40. The teeth 98 are engaging with window teeth 78 formed in the flange 86 of the lower rail 24 thereby locking the upper rail 26 to the lower rail 24 at the seated position.

Upon actuation of the recliner handle 32, or in the alternative the egress mechanism 34, the recliner mechanism 30 will release the seat back 22 from the seated position and the seat back biasing member 28 will move the seat back 22 from the seated position to the stowed position. Movement of the seat back 22 in the direction of arrow C2, pulls the seat back end 64 of the cable 60 in the direction of arrow C3. The force exerted by the bracket end 62 on the second end 54 of the bracket 46 overcomes the biasing force of the bracket biasing member 68, and the bracket 46 rotates in the direction of arrow C4. As the bracket 46 is connected to the actuation mechanism 50, the elongated rod 72 and the paddle member 74 are rotated in the direction of arrow C5.

In addition, as the proximate end 58 of the link member 48 is pivotally attached to the first end 52 of the bracket 46, the link member 48 is pulled in the direction of arrow C6 overcoming the biasing force of the link biasing member 70. Due to the connection between the link member 48 and the slide handle 44, the slide handle 44 is rotated about pivot axis P2 in the direction of arrow C7 which will lift the slide handle 44 in the direction of arrow C8. Thereby, moving the lever mechanism 42 from the first position to the second position due to the movement of the seat back 22 from the seated position to the stowed position.

The rotation of the actuation mechanism 50 in the direction of C5 moves the main lock 38 from the locked position as seen in FIG. 9A to the unlocked position as seen in FIG. 9B. In addition, the rotation of the actuation mechanism 50 in the direction of C5 moves the cargo lock 40 from an unlocked position towards the locked position. As seen in FIG. 9B, the seat assembly 16 is still in the seated position and there are no window tabs 80 for the tabs 96 to engage. The cargo lock 40 is in an engaged position with the tabs 96 abutting the flange 86. The seat assembly 16 is now movable in the direction of arrow C9 towards the cargo position where the tabs 96 will align with and engage the window tabs 80 to lock the upper rail 26 to the lower rail 24 in the cargo position, as seen in FIG. 10A.

Figure 6:
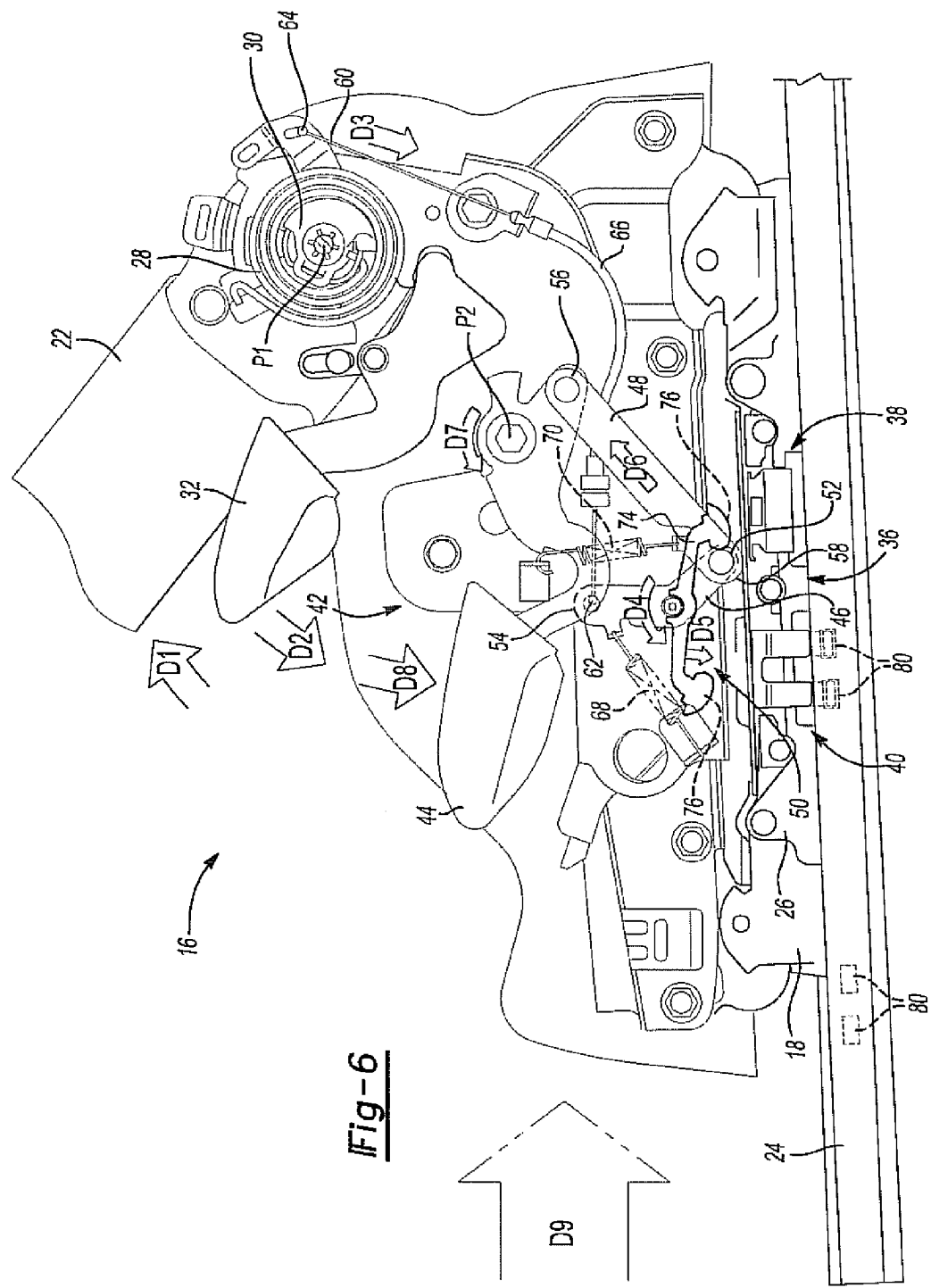
FIG. 6 is a partial side elevational view of the seat assembly illustrating the seat assembly locked in the cargo position and the movement of the lever mechanism from the second position to the first position due to the movement of the seat back from the stowed position to the seated position.

FIG. 6 illustrates the seat assembly 16 locked in the cargo position, with the seat back 22 in the stowed position and the lever mechanism 42 in the second position. FIG. 10A depicts the actuation mechanism 50 positioned with one shoe 76 lifted off the cargo lock 40 extension 95 to lock the cargo lock 40, and the other shoe 76 depressing the main lock 38 extension 94 to unlock the main lock 38. The tabs 96 are engaging with the window tabs 80 formed in the flange 86 of the lower rails 24, thereby, locking the upper rails 26 to the lower rails 24 at the cargo position.

In order to unlock the seat assembly 16 from the cargo position, the seat back 22 is moved from the stowed position to the seated position in the direction of arrow D1. The recliner handle 32 rotates in the direction of arrow D2, and the seat back end 64 of the cable 60 moves in the direction of arrow D3. With the force of the bracket end 62 of the cable 60 no longer overcoming the biasing force of the bracket biasing member 68, the bracket 46 rotates in the direction of arrow D4. As the bracket 46 is connected to the actuation mechanism 50, the elongated rod 72 and the paddle members 74 are rotated in the direction of D5.

In addition, as the proximate end 58 of the link member 48 is pivotally attached to the first end 52 of the bracket 46, the link member 48 is pushed in the direction of arrow D6. Due to the connection between the distal end 56 of the link member 48 and the slide handle 44, the slide handle 44 is rotated about pivot axis P2 in the direction of arrow D7 which will move the slide handle 44 in the direction of arrow D8. Thereby, moving the lever mechanism 42 from the second position to the first position due to the movement of the seat back 22 from the stowed position towards the seated position. The bracket biasing member 68 and the link biasing member 70 facilitate the movement of the lever mechanism 42 from the second position to the first position.

The rotation of the actuation mechanism 50 in the direction of arrow D5 moves the cargo lock 40 from the locked position, as seen in FIG. 10A, to the unlocked position as seen in FIG. 10B. In addition, the rotation of the actuation mechanism 50 in the direction of D5 moves the main lock 38 from the unlocked position towards the locked position. As seen in FIG. 10B, the seat assembly is still in the cargo position and there are no window teeth 78 for the teeth 98 to engage. The main lock 38 is in the engaged position with the teeth 98 abutting the flange 86. The seat assembly 16 is now movable in the direction of arrow D9 towards the seated position where the teeth 98 will align with and engage the window teeth 78 to lock the upper rail 26 to the lower rail 24 in the seated position as seen in FIG. 9A.

It is appreciated, of course, that movement of the seat back 22 from the seated position towards the stowed position may be due to the actuation of egress mechanism 34, as seen in FIG. 1. An occupant seated behind the seat assembly 16 pulls the strap S in the direction of arrow 1, which actuates the recliner handle 32 in the direction of arrow 2. The movement of the recliner handle 32 operates the recliner mechanism 30 to move the seat back 22 from the seated position to the stowed position in the direction of arrow 3. The movement of the seat back 22 operates to move the lever mechanism 42 from the first position to the second position, as seen in the slide handle 44 moving in the direction of arrow 4. Upon movement of the lever mechanism 42 from the first to the second position, the main lock 38 is moved from the locked position to the unlocked position and the cargo lock is moved from the unlocked position to the engaged position allowing the occupant seated behind the seat assembly 16 to the move and lock the seated assembly 16 from the seated position to the cargo position in the direction of arrow 5 through the actuation of only the egress mechanism 34 via the strap S.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims the invention may be practiced other than as specifically described.

What is claimed is:

1. A seat assembly for supporting an occupant above a floor of a passenger compartment of an automotive vehicle having a pair of lower rails, said seat assembly comprising:
   a seat frame having a pair of upper rails in sliding engagement with the pair of lower rails to move said seat assembly between a seated position and a cargo position;
   a locking mechanism having a first lock to lock said upper rails to the lower rails when said seat assembly is in said seated position and a second lock to lock said upper rails to the lower rails when said seat assembly is in said cargo position;
   a lever mechanism having a handle pivotally mounted to said seat frame, said lever mechanism moveable between a first position and a second position, said lever mechanism engages with said locking mechanism such that when said lever mechanism is in said first position said first lock locks said upper rails to the lower rails when said seat assembly is in said seated position, and when said lever mechanism is in said second position said second lock locks said upper rails to the lower rails when said seat assembly is in said cargo position; and
   a seat back pivotally mounted to said seat for movement between a seated position and a stowed position, said seat back connected to said lever mechanism such that movement of said seat back from said seated position to said stowed position moves said lever mechanism from said first position to said second position and movement of said seat back from said stowed position to said seated position moves said lever mechanism from said second position to said first position.

2. The seat assembly of claim 1, wherein said handle being actuated by the occupant to move said lever mechanism between said first position to said second position when said seat back is in said seated position.

3. The seat assembly of claim 2, wherein said lever mechanism includes a paddle member having a first end which engages with said first lock upon movement of said lever mechanism from said first position to said second position to unlock said seat assembly from said seated position and a second end which engages with said second lock upon movement of said lever mechanism from said second position to said first position to unlock said seat assembly from said cargo position.

4. The seat assembly of claim 3, wherein said lever mechanism includes a bracket attached to said paddle member such that rotation of said bracket rotates said paddle member and a link member having a proximate end and a distal end, said proximate end pivotally attached to said bracket and said distal end pivotally attached to said handle such that movement of said handle rotates said paddle member.

5. The seat assembly of claim 4, wherein said bracket has a generally V shape having a first end and a second end, said paddle member attached to said bracket between said first end and said second end, and wherein said second end is pivotally attached to said proximate end of said link member.

6. The seat assembly of claim 5, wherein said seat assembly includes a connector having a first end attached to said seat back and a second end attached to said first end of said bracket such that movement of said seat back from said seated position to said stowed position moves said lever mechanism from said first position to said second position.

7. The seat assembly of claim 6, wherein said lever mechanism includes a first biasing member disposed between said seat frame and said bracket to facilitate movement of said lever mechanism from said second position to said first position upon movement of said seat back from said stowed position to said seated position.

8. The seat assembly of claim 6, wherein said lever mechanism includes a second biasing member disposed between said seat frame and said link member to facilitate movement of said lever mechanism from said second position to said first position upon movement of said seat back from said stowed position to said seated position.

9. The seat assembly of claim 1, wherein said locking mechanism includes a pair of said first locks and a pair of said second locks such that one of said pair of said first locks and one of said pair of said second locks are attached to each one of said pair of upper rails, and wherein said lever mechanism includes a pair of said paddle members attached to an elongated rod connected to said bracket, wherein one of said pair of paddle members engages with one of said pair of said first locks and one of said pair of second locks on each of said pair of upper rails.

10. The seat assembly of claim 6, wherein said connector is a cable.

11. The seat assembly of claim 10, wherein said cable is a Bowden cable having a housing, said housing having a first end attached to said seat frame and an opposite second end attached to said seat frame.

12. A seat assembly for supporting an occupant above a floor of a passenger compartment of an automotive vehicle, said seat assembly comprising:
a seat frame having a pair of upper rails in sliding engagement with a pair of lower rails to move said seat assembly between a seated position and a stowed position, said lower rails attached to the floor;
a locking mechanism having a first lock attached to each one of said upper rails to lock said upper rails to said lower rails when said seat assembly is in said seated position and a second lock attached to each one of said upper rails to lock said upper rails to said lower rails when said seat assembly is in said cargo position;
a lever mechanism moveable between a first position and a second position, said lever mechanism having a handle, a rotating bracket and a link member, said handle being pivotally attached to said seat frame, said rotating bracket having a generally V-shape having a first end and a second end, said link member has a proximate end pivotally attached to said second end of said bracket and a distal end pivotally attached to said handle, wherein said lever mechanism engages with said locking mechanism such that when said lever mechanism is in said first position said first lock locks said upper rails to the lower rails when said seat assembly is in said seated position, and when said lever mechanism is in said second position said second lock locks said upper rails to the lower rails when said seat assembly is in said cargo position;
a seat back pivotally mounted to said seat for movement between a seated position and a stowed position; and
a cable having a first end connected to said seat back and a second end connected to said first end of said bracket such that movement of said seat back from said seated position to said stowed position moves said lever mechanism from said first position to said second position and movement of said seat back from said stowed position to said seated position moves said lever mechanism from said second position to said first position.

13. The seat assembly of claim 12, wherein said handle capable of being actuated by the occupant to move said lever mechanism between said first position to said second position when said seat back is in said seated position.

14. The seat assembly of claim 12, wherein said lever mechanism includes an elongated rod rotatably attached to said seat frame at one end and attached to said bracket at an opposite end such that rotation of said bracket rotates said elongated rod, said elongated rod having a pair of paddle members each having a first end which engages with said first locks upon movement of said lever mechanism from said first position to said second position to unlock said seat assembly from said seated position and a second end which engages with said second locks upon movement of said lever mechanism from said second position to said first position to unlock said seat assembly from said cargo position, a bracket attached to one end of said elongated rod.

15. The seat assembly of claim 12, wherein said lever mechanism includes a first biasing member disposed between said seat frame and said bracket and a second biasing member disposed between said seat frame and said link member, wherein said first biasing member and said second biasing member facilitate movement of said lever mechanism from said second position to said first position upon movement of said seat back from said stowed position to said seated position.

\* \* \* \* \*